United States Patent Office 3,674,459
Patented July 4, 1972

1

3,674,459
PHYTOTOXIC COMPOSITIONS
Gerhard H. Alt, St. Louis, Mo., assignor to
Monsanto Company, St. Louis, Mo.
No Drawing. Filed June 30, 1969, Ser. No. 837,893
Int. Cl. A01n 9/20
U.S. Cl. 71—18        15 Claims

ABSTRACT OF THE DISCLOSURE

Herbicidal use, especially for barnyard grass in the presence of rice, of a compound of the formula

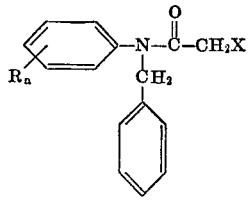

wherein R is selected from the group consisting of alkyl having a maximum of four carbon atoms, alkoxy having a maximum of four carbon atoms, chlorine, bromine, nitro and carboxyalkyl, said alkyl moiety having a maximum of four carbon atoms; X is selected from the group consisting of chlorine and bromine; and $n$ is one of the integers 1 to 3.

This invention relates ot the herbicidal use of N-benzyl derivatives of α-haloacetanilides and in particular to the control of grasses, especially barnyard grass, in the presence of rice.

In accordance with this invention, it has been found that the growth of germinant seeds, emerging seedlings and established vegetation can be controlled and modified by exposing the seeds, emerging seedings or the roots or aboveground portions of established vegetation to the action of an herbicidal effective amount of one or more of a N-benzyl-α-haloactanilide of the formula

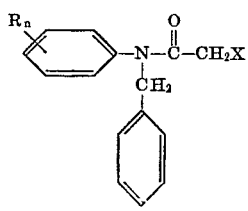

wherein R is selected from the group consisting of alkyl having a maximum of four carbon atoms, alkoxy having a maximum of four carbon atoms, chlorine, bromine, nitro and carboxyalkyl said alkyl moiety having a maximum of four carbon atoms; X is selected from the group consisting of chlorine and bromine; and $n$ is one of the integers 1 to 3.

2

The preferred compounds of this invention are the compounds in which X is chlorine and $n$ is the integer 1.

Still further preferred compounds are the compounds in which $n$ is the integer 1; X is chlorine; and R is alkyl and is in the 2'-position.

Nomenclature for the compounds of this invention will be as follows:

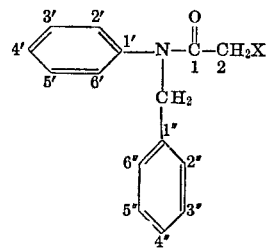

The preparation of the N-benzyl-α-chloroacetanilides of this invention are by conventional means, such as the reaction of the substituted N-benzylaniline with α-haloacetyl halide. This reaction is usually conducted in an inert solvent with the addition of a base. The starting substituted N-benzylanilines are also made by conventional methods, such as the reaction of the substituted aniline with benzyl chloride.

Preparation of the compounds of this invention is illustrated by the following examples.

EXAMPLE 1

This example describes the preparation of N-benzyl-2'-methyl-2-chloroacetanilide.

To a suitable vessel was charged 59.19 grams (0.3 mole) N-benzyl-O-toluidine in 150 ml. benzene. To this was added dropwise a solution consisting of 35.03 grams chloroacetylchloride in 75 ml. benzene. The resultant mixture was refluxed two days. The benzene was then removed by distillation under reduced pressure and the residue distilled collecting the fraction boiling 158–159° C./0.35 mm.

Calc'd for $C_{16}H_{16}NClO$ (percent): C, 70.18; H, 5.90; N, 511; Cl, 12.95. Found (percent): C, 70.24; H, 5.86; N, 5.09; Cl, 12.97.

EXAMPLE 2

This example describes the preparation of N-benzyl-2'-nitro-4'-chloro-2-chloroacetanilide.

To a suitable vessel was charged 13.2 gms. (0.05 moles) N-benzyl-4-chloro-2-nitroaniline in 75 ml. xylene. To this was added dropwise 8.1 grams (0.05 mole) chloroacetyl chloride. The resultant mixture was refluxed for 18 hours. The xylene was then removed yielding a viscous oil which crystallized on standing. Recrystallized from chloroform-methylcyclohexane mixture, melting at 67–69° C.

Calc'd for $C_{15}H_{12}Cl_2N_2O_3$ (percent): C, 53.11; H, 3.57; N, 8.26; Cl, 20.90. Found (percent): C, 53.29; H, 3.71; N, 8.30; Cl, 21.01.

Other compounds prepared according to the procedures outlined above include

N-benzyl-2'-nitro-2,4',5'-trichloroacetanilide
N-benzyl-4'-methoxy-2-chloroacetanilide
N-benzyl-2'-methoxy-2-chloroacetanilide
N-beznyl-2'-ethyl-2-chloroacetanilide
N-benzyl-2'-nitro-2-chloroacetanilide
N-benzyl-2'-ethoxy-2-chloroacetanilide
N-benzyl-2'-carboxyethyl-2-chloroacetanilide
N-benzyl-2'-carboxyethyl-2-chloroacetanilide
N-benzyl-3',2-dichloroacetanilide
N-benzyl-3'-methyl-2-chloroacetanilide
N-benzyl-4'-methyl-2-chloroacetanilide
N-benzyl-2',4'-dimethyl-2-bromoacetanilide
N-benzyl-2'-methoxy-4'-methyl-2-bromoacetanilide
N-benzyl-2'-methyl-2,4'-dichloroacetanilide
N-benzyl-3'-carboxyethyl-2',2-dichloroacetanilide
N-benzyl-2',4'-dinitro-2-chloroacetanilide The herbicidal compositions of this invention contain at least one active ingredient and a material referred to in the art as a herbicidal adjuvant in liquid or solid form. The heribicidal compositions are prepared by admixing the active ingredient with an adjuvant including diluents, extenders, carriers and conditioning agents to provide compositions in the form of finely-divided particulate solids, granules, pellets, solutions and aqueous dispersions or emulsions.

Typical finely-divided solid carriers and extenders which can be used in the herbidicidal compositions of this invention include but are not limited to talcs, clays, pumice, silica, diatomaceous earth, quartz, Fuller's earth, powdered cord powdered wood, walnut flour, chalk, tobacco dust, volcanic ash and the like. Typical liquid diluents include but is not limited to kerosene, Stoddard solvents, hexane, benzene, toluene, acetone, ethylene dichloride, xylene, alcohols, diesel oil, glycols and the like.

The herbiicidal compositions of this invention, particularly liquids and wettable particles, usually contain as a conditioning agent one or more surface-active agents in amounts suffiicent to render a given composition readily dispersible in water or oil. By the term "surface-active agent" it is understood that wetting agents, dispersing agents, suspending agents and emulsifying agents are included therein.

The term "herbicidal compositions" as used herein and in the appended claims is intended to mean not only compositions in a suitable form for applications but also concentrated compositions which require dilution or extension with a suitable quantity of liquid or solid adjuvant prior to application.

The term "plant system" as used herein and in the appended claims means germinant seeds, emerging seedlings and established vegetation including the roots and above-ground portions.

EXAMPLE 3

The pre-emergent herbicidal activity of representative N-benzyl-α-haloacetanilides of this invention is demonstrated as follows:

A good grade of top soil is placed in aluminum pans and compacted to a depth of ⅜ to ½ inch from the top of the pan. A pre-determined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain a rate of application of 5 lbs. per acre. The pans were then placed on a sand bench in the greenhouse and watered from below as needed. The plants are obesrved at the end of approximately 14 days and the results recorded. The herbicidal activity index is based on the average percent germination of each seed lot. The activity index is converted to a relative numerical scale for the sake of brevity and simplicity. The results are recorded in Table I.

The pre-emergent herbicidal activity used in the following example is defined as follows:

| Numerical scale: | Herbicidal activity |
|---|---|
| 0 | None. |
| 1 | Slight. |
| 2 | Moderate. |
| 3 | Severe. |

TABLE I.—PRE-EMERGENT ACTIVITY

| Plant species | Compound | | |
|---|---|---|---|
| | A | B | C |
| Morning glory | 0 | 0 | 0 |
| Wild oat | 1 | 0 | 2 |
| Brome grass | 3 | 3 | 3 |
| Rye grass | 2 | 1 | 3 |
| Radish | 0 | 1 | 0 |
| Sugar beet | 0 | 3 | 0 |
| Foxtail | 3 | 3 | 3 |
| Crab grsas | 3 | 3 | 3 |
| Pigweed | 3 | 3 | 3 |
| Soybean | 0 | 0 | 0 |
| Wild buckwheat | 1 | 0 | 1 |
| Tomato | 0 | 0 | 0 |
| Sorghum | 0 | 1 | 2 |

Compound (A): N-benzyl-2'-methyl-2-chlorocetanilide.
Compound (B): N-benzyl-2'-methoxy-2-chloroacetanilide.
Compound (C): N-benzyl-3'-methyl-2-chloroacetanilide.

EXAMPLE 4

This example demonstrates the post-emergent herbicidal activity of representative N-benzyl-α-chloroacetanilides of this invention.

The active ingredient is applied in spray form to 14-day old speciments of the same plant species used in the pre-emergent tests above. The herbicidal sprays are acetone-water solutions containing 0.5% active ingredient. The solutions are applied at a rate equal to approximately 10 lbs. per acre of active ingredient. The treated plants are placed in a greenhouse and the effects observed and recorded after approximately 14 days. The results are recorded in Table II.

The post-emergent herbicidal activity index used in this example is based on the average percent injury of each plant species and is defined as follows:

| Numerical scale: | Herbidical activity |
|---|---|
| 0 | None. |
| 1 | Slight. |
| 2 | Moderater. |
| 3 | Severe. |
| 4 | Plants dead. |

TABLE II.—POST-EMERGENT HERBICIDAL ACTIVITY

| Plant species | Compound | | |
|---|---|---|---|
| | A | B | C |
| Morning glory | 1 | 1 | 2 |
| Wild oat | 0 | 1 | 0 |
| Brome grass | 0 | 1 | 1 |
| Rye grass | 0 | 0 | 1 |
| Radish | 1 | 4 | 2 |
| Sugar beet | 2 | 2 | 2 |
| Fox tail | 1 | 1 | 2 |
| Crab grass | 1 | 2 | 2 |
| Pigweed | 4 | 3 | 4 |
| Soybean | 1 | 1 | 1 |
| Wild buckwheat | 4 | 0 | 1 |
| Tomato | 2 | 1 | 2 |
| Sorghum | 1 | 1 | 1 |

Compound (A): N-benzyl-3'-carboethoxy-2-chloroacetanilide.
Compound (B): N-benzyl-2'-nitro-2,4'-dichloroacetanilide.
Compound (C): N-benzyl-4'-methoxy-2-chloroacetanilide.

The compounds of this invention have also been found to have a selective effect on grasses, especially barnyard grass, in the presence of rice. The compounds exhibit a relatively high safety factor as to the control of grasses in presence of rice which increases their commercial potential.

EXAMPLE 5

This example demonstrates the pre-emergent control of barnyard grass in flooded, transplanted rice.

Rice seeds from Japan (transplanted variety) are grown in Memphis silt loam soil, in small plastic pots, with subirrigation at about 80° F. and 75% relative humidity until the plants average 6 to 9 inches in height and have 2 to 3 leaves. At this time barnyard grass seeds are sown at a depth of about 1/8 to 1/4 of an inch. The pots are then placed in containers and flooded to at least a 1/4 inch head of water. The herbicide, N-benzyl-2'-methyl-2-chloroacetanilide in 30 ml. of solvent-water mixture, is added to the flood pots. The head of water is allowed to recede for 2 days to allow germination of the barnyard grass, then the flooded head of water is re-established and maintained for 2 weeks and the plants observed for barnyard grass control and rice inhibition. The results are recorded in Table III.

The numerical data in Table III has the same meaning as in Table I.

TABLE III.—PRE-EMERGENT ACTIVITY ON FLOODED RICE

| | Herbicidal activity | |
|---|---|---|
| | Rice | Barnyard grass |
| Lbs./acre: | | |
| 4 | 1.0 | 3 |
| 2 | 0.5 | 3 |
| 1 | 0 | 3 |
| 0.5 | 0 | 2 |
| 0.25 | 0 | 3 |
| 0.125 | 0 | 0.5 |

EXAMPLE 6

This example demonstrates the pre-emergent control of barnyard grass in dryland direct seeded rice.

Blue Bonnet rice seeds and barnyard grass seeds are sown at 1/2 inch depth in Memphis silt loam soil in small plastic pots. The herbicide, N-benzyl-2'-methyl-2-chloroacetanilide in an acetone-water solvent, is applied to the surface at the desired rate. The pots are initially irrigated from overhead, with subsequent irrigations being sub-irrigations. The pots are placed in a green house for a period of time between 2½ to 3 weeks at 75° F. and then observed for barnyard grass and rice inhibition. The results are recorded in Table IV.

The numerical data in Table IV has the same meanings as in Table I and is the average of three runs.

TABLE IV.—PRE-EMERGENT ACTIVITY ON DRYLAND RICE

| | Herbicidal activity | |
|---|---|---|
| | Rice | Barnyard grass |
| Lbs./acre: | | |
| 4 | 0.3 | 3 |
| 2 | 0.3 | 3 |
| 1 | 0 | 3 |
| 0.5 | 0 | 3 |
| 0.25 | 0 | 2.3 |

As mentioned hereinbefore the herbicidal compositions of this invention comprises an active ingredient and one or more herbicidal adjuvants which can be solid or liquid extenders, carriers, diluents, conditioning agents and the like. Preferred herbicidal compositions containing the active ingredients of this invention have been developed so that the active ingredients can be used to the greatest advantage to modify the growth of plant systems in soil. The preferred compositions comprise certain wettable powders, aqueous suspensions, dust formulations, granules, emulsifiable oils and solutions in solvents. In general these preferred compositions can all contain one or more surface-active agents.

Surface-active agents which can be used in the herbicidal compositions of this invention are set out, for example, in Searle U.S. Pat. 2,426,417; Todd U.S. Pat. 2,655,- 447; Jones U.S. Pat. 2,412,510; and Lenher U.S. Pat. 2,139,276. A detailed list of such agents is also set forth by J. W. McCutcheon in "Soap and Chemical Specialties," November 1947, page 8011 et seq., entitled "Synthetic Detergents"; "Detergents and Emulsifiers—Up to Date" (1960), by J. W. McCutcheon, Inc., and Bulletin E-607 of the Bureau of Entomology and Plant Quarantine of the U.S.D.A. In general less than 15 parts by weight of the surface-active agent is present per 100 parts by weight of the herbicidal composition.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, amines or acid amides; long chain acid esters of sodium isothionate, esters of sodium sulfosuccinate, sulfated orsulfonated fatty acid esters, petroleum sulfonates, sulfonated vegetable oils and ditertiary acetylinic glycols. Preferred dispersants are methyl cellulose, polyvinyl alcohols, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions of this invention usually contain from about 5 to about 95 parts of active ingredient, from about 0.25 to about 3.0 parts of wetting agent, from about 0.25 to about 7 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both.

Aqueous suspensions are usually prepared by mixing together an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dusts are dense finely-divided particulate compositions which are intended for application to the soil in dry form. Dusts are characterized by their free-flowing and rapid settling properties so that they are not readily wind-borne to areas where they are of no value. Dusts contain primarily an active ingredient and a dense, free-flowing, finely-divided particulate extender. However, their performance is sometimes aided by the inclusion of a wetting agent such as those listed hereinbefore under settable powder compositions and convenience in manufacture frequently demands the inclusion of an inert, absorptive grinding aid. Suitable class of grinding aids are natural clays, diatomaceous earth and synthetic minerals derived from silica or silicate. Preferred grinding aids include attapulgite clay, diatomaceous silica, synthetic fine silica and synthetic calcium and magnesium dilicates.

The inert finely-divided solid extender for the dusts can be of vegetable or mineral origin. The solid extenders are characterized by possessing relatively low surface areas and are poor in liquid absorption. Suitable inert solid extenders for herbicidal dusts include micaceous talcs, pyrophyllite, dense kaolin clays, ground calcium phosphate rock and tobacco dust. The dusts usually contain from about 0.5 to 99 parts active ingredient, 0 to 50 parts grinding aid, 0 to 3 parts wetting agent and 1 to 99.5 parts dense solid extender, all parts being by weight based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible solvents together with a surfactant. Suitable solvents for the active ingredient of this invention include hydrocarbons and water-immiscible ethers, esters or ketones. Suitable surfactants are anionic, cationic and non-ionic such as alkyl aryl polyethoxy alcohols, alkyl and alkyl aryl polyether alcohols, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 10 parts surfactant and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surfactant such as those listed hereinbefore under wettable powders can be present in the composition. Natural clays, pyrophyllites and vermiculite are examples of operable classes of particulate mineral extenders. The preferred extenders are the porous, absorptive, preformed particles such as preformed and screened particulate attapulgite or heat expended, particulate vermiculite, and the finely-divided clays such as kaolin clays, hydrated attapulgite or bentonitic clays. These extenders are sprayed or blended with the active ingredient to form the herbicidal granules.

The mineral particles which are used in the granular herbicidal compositions of this invention usually have a size range of 10 to 100 mesh, but preferably such that a large majority of the particles have form 14 to 60 mesh with the optimum size being from 20 to 40 mesh. Clay having substantially all particles between 14 and 80 mesh and at least about 80 percent between 20 and 40 mesh is particularly preferred for use in the present granular compositions. The term "mesh" as used herein means U.S. Sieve Series.

The granular herbicidal compositions of this invention generally contain from about 1 part to about 30 parts by weight of the substituted N-benzyl-$\alpha$-chloroacetanilide per 100 parts by weight of clay and 0 to about 5 parts by weight of wetting agent per 100 parts by weight of clay. The preferred herbicidal granular compositions contain from about 5 parts to about 25 parts by weight of active ingredient per 100 parts by weight of clay.

The herbicidal compositions of this invention can also contain other additaments, for example, fertilizers, other herbicides, pesticides and the like, used as adjuvant or in combination with any of the above-described adjuvants.

Fertilizers useful in combination with the active ingredients include, for example ammonium nitrate, urea and superphosphate. Other useful additaments include materials in which plant organisms take root and grow such as compost, manure, humus, sand and the like.

When operating in accordance with the present invention, effective amounts of the substituted N-benzyl-$\alpha$-chloroacetanilide are dispersed on or in the soil or plant growth media and applied to plant systems in any convenient fashion. Application to the soil or growth media can be carried out by simply mixing with the media, by applying to the surface of the soil and thereafter dragging or discing into the soil to the desired depth, or by employing a liquid carrier to accomplish the penetration and impregnation. The application of liquid and particulate solid herbicidal compositions to the surface or soil or to plant systems can be carried out by conventional methods, e.g., power dusters, boom and hand sprayers and spray dusters. The compositions can also be applied from airplanes as a dust or a spray because of their effectiveness to low dosages. In a further method, the distribution of the active ingredients in soil can be carried out by admixture with the water employed to irrigate the soil. In such procedures, the amount of water can be varied with the porosity and water holding capacity of the soil obtain the desired depth of distribution of the active ingredient.

In foliar treatment for the control of vegetative growth, the active ingredients are applied in amounts from about 1 to about 50 or more pounds per acre. In applications to soil for the control of the growth of germinant seeds, emerging seedlings and established vegetation, the active ingredients are applied in amounts from about 1 to about 50 or more pounds per acre.

In the use of the compounds of this invention in the control of grasses, especially barnyard grass, in the presence of rice, the compound may be applied in dryland planting, as discussed for the general herbicide treatment. The compound is applied after the rice seed as been planted. In the case of floodland rice, the compound is applied to the soil or the flooded area after the transplant has been fixed. In either case the compound is applied at a rate of about 0.125 to about 6 lbs. per acre.

The compounds of this invention may be used in combination with known herbicides. The use of various herbicides in combination at the time of a single application or sequentially is common in practice. Herbicides which may be used in combination with the compounds of this invention include but are not limited to: substituted phenoxyaliphatic acids such as 2,4-dichlorophenoxyacetic acid; 2,4,5- trichlorophenoxyacetic acid, 2 - methyl - 4 - chlorophenoxyacetic acid and the salts, esters and amides thereof; triazine derivatives, such as 2-chloro-4-ethylamino - 6 - isopropylamino - s - triazine; 2,4-bis(isopropylamino)-s-triazine; urea derivatives such as 3-(3,4-dichlorophenyl) - 1,1 - dimethylurea and 3 - (m - trifluoromethylphenyl) - 1,1 - dimethylurea and 3 - (3,4 - dichlorophenyl) - 1 - methoxy - 1 - methylurea; pyridylium derivatives such as 1:1' - ethylene - 2,2 - dipyridylium dihalide; acetanilides such as N - isopropyl - alpha - chloroacetanilide, and 2 - chloro - 2',6' - diethyl - N - methoxymethyl acetanilide; acetamides such as N,N-diallyl-alpha-chloroacetamide, carbamates such as ethyl - N,N - di-n-propylthiocarbamate, and 2,3-dichloroallyl diisopropylthiolcarbamate; substituted uracils such as 5-bromo-3-sec-butyl-6-methyluracil, substituted anilines such as N,N-dipropyl - alpha,alpha,alpha - trifloro - 2,6 - dinitro-p-toluidine; pyridazone derivatives such as 5-amino-4-choloro - 2 - phenyl - 3 - (2H - pyridazinone, anilides such as 3',4'-dichloropropanilide, and the like.

When the compounds are used as a selective herbicide in the control of grasses in the presence of rice, they may be combined with 3',4'-dichloropropanilide.

The terms "soil" and "growth media" are employed in the present specification and claims in their broadest sense to be inclusive of all conventional "soils" as defined in Webster's New Internationl Dictionary, second edition, Unabridged (1961). Thus, the terms refer to any substance or media in which vegetation may take root and grow, and are intended to include not only earth but compost, manure, muck, humus, sand and the like, adapted to support plant growth.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto to be limited to the examples and description set forth herein but rather the claims be construed as encompassing all the features of patentable novelty which reside in the present invention including all features which would be treated as equivalent

What is claimed is:

1. A method of controlling the growth of undesirable plants which comprises applying to plant systems a herbicidal effective amount of a compound of the formula

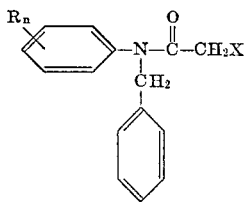

wherein R is selected from thhe group consisting of alkyl having a maximum of four carbon atoms, alkoxy having a maximum of four carbon atoms, chlorine, bromine, nitro and carboxyalkyl, said alkyl moiety having a maximum of four carbon atoms; X is selected from the group consisting of chlorine and bromine; and $n$ is one of the integers 1 to 3.

2. A method in accordance with claim 1 in which X is chlorine and $n$ is 1.

3. A method in accordance with claim 2 in which the compound is N-benzyl-2'-methoxy-2-chloroacetanilide.

4. A method in accordance with claim 2 in which the compound is N-benzyl-3'-methyl-2-chloracetanilide.

5. A method in accordance with claim 2 in which the compound is N-benzyl-3'-carboethoxy-2-chloracetanilide.

6. A method in accordance with claim 2 in which the compound is N-benzyl-4'-methoxy-2-chloroacetanilide.

7. A method in accordance with claim 2 in which R is alkyl and is in the 2' position.

8. A method in accordance with claim 7 in which the compound is N-benzyl-2'-methyl-2-chloroacetanilide.

9. A method in accordance with claim 1 in which the compound is N-benzyl-2'-nitro-2,4'-dichloroacetanilide.

10. A method in controlling the growth of grass in the presence of rice which comprises applying to the area to be protected a herbicidal effective amount of a compound of the formula

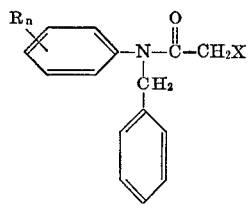

wherein R is selected from the group consisting of alkyl having a maximum of four carbon atoms, alkoxy having a maximum of four carbon atoms, chlorine, bromine, nitro and carboxyalkyl, said alkyl moiety having a maximum of four carbon atoms; X is selected from the group consisting of chlorine and bromine; and $n$ is one of the integers 1 to 3.

11. A method in accordance with claim 10 in which X is chlorine and $n$ is 1.

12. A method in accordance with claim 11 in which R is alkyl and is in the 2' position.

13. A method in accordance with claim 12 in which the compound is N-benzyl-2'-methyl-2-chloroacetanilide.

14. A method in accordance with claim 10 in which the grass is barnyard grass.

15. A method in accordance with claim 14 in which the compound is N-benzyl-2'-methyl-2-chloroacetanilide.

References Cited

FOREIGN PATENTS 594,237    3/1960    Canada _____ 71—118

JAMES O. THOMAS JR., Primary Examiner

U.S. Cl. X.R.

260—558; 71—92, 93, 94, 100, 109, 110, 116, 117, 120, 121